United States Patent Office 3,349,883
Patented Oct. 31, 1967

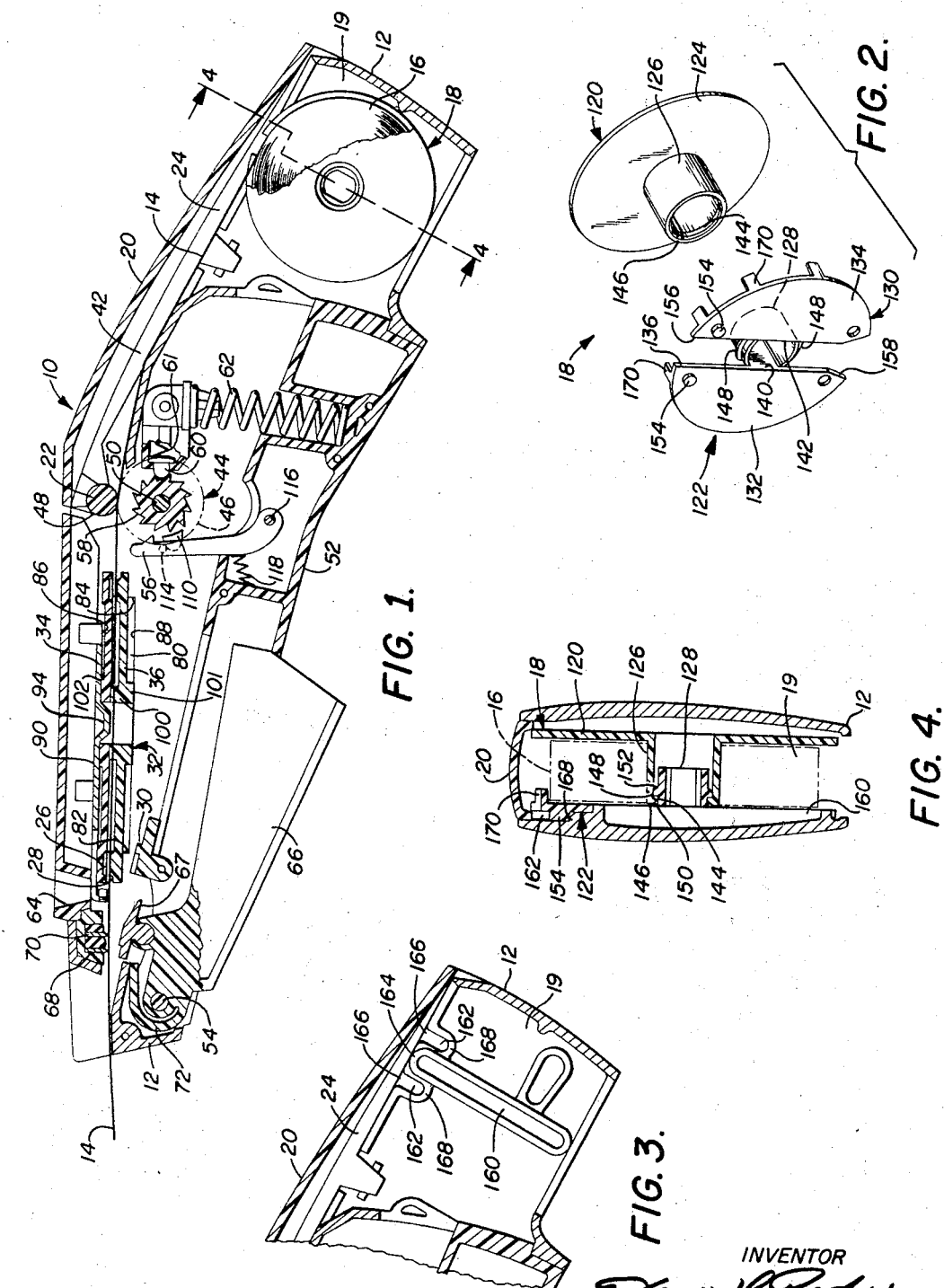

3,349,883
EMBOSSING TOOLS AND MAGAZINE SUPPLIES FOR USE IN COMBINATION THEREWITH
Dane H. Pedersen, Moraga, Calif., assignor to Dymo Industries, Inc., Emeryville, Calif., a corporation of California
Filed May 9, 1966, Ser. No. 548,512
11 Claims. (Cl. 197—6.7)

ABSTRACT OF THE DISCLOSURE

An embossing tool for embossing characters in strip material and a spool-like magazine for storing a coil of the strip material in the tool, the magazine including two unitary members, one of which has an arbor carrying the coil and the other of which has a spindle retained within the arbor so that the arbor can rotate relative to the spindle to dispense the strip, each unitary member having a flange so that the coil is retained on the arbor between the flanges, a slot extending through the flange of the member having the spindle and across at least part of the spindle to provide means for cooperatively engaging a corresponding key in the tool to anchor the flange, and hence the spindle, against rotation in the tool when the magazine is in the tool, the slot also dividing the flange into segments such that the flange can be torn readily from the spindle to allow removal of the coil, intact, from the spindle when the magazine is not to be used in a particular tool. Means are provided in the slotted flange for locating and securing the flange, and hence the magazine, within the tool.

The present invention relates generally to embossing tools for embossing strip material which is supplied to the tools in magazines and to magazines for use in combination with such tools. More specifically, the invention pertains to magazines which permit ready advancement and retraction of the tape supply stored therein, which are readily accurately located within tools having means for accurately locating and positively securing such magazines within the tools, and which are readily dismantled or dismembered to release the strip material stored therein.

A variety of embossing tools are presently available for establishing embossments in strips of embossable material in the fabrication of labels, signs, plates, tags, and the like. More recently, such tools have been developed for embossing various indicia on thin plastic strips from sheeted thermoplastic resins which are capable of being cold-formed to establish a contrast color relief enfigurement therein. Usually, the tools employ embossing means for establishing the desired embossments, a supply of strip material and means for feeding the strip material from the supply to the embossing means. Often, the strip material is supplied from a magazine placed in the body of the tool; however, many tools are available which employ strip material in coiled form without a magazine. The strip material is usually in the form of an elongated flexible tape having a constant, closely controlled width.

The smooth, reliable operation of the tool requires that the strip material be fed readily from the supply by the feed means and be fed back, or retracted, into the supply when desired. Thus, it is desirable that any magazine carrying a tape supply be constructed to allow the accomplishment of such advancement or retraction of the tape with ease. At the same time, the registry and securement of a magazine supply within the body of the tool becomes an important factor in the overall performance of the tool and proper registry and securement of a magazine supply should be accomplished without sacrificing ease of insertion and removal of magazines. It is further recognized that in view of the existence of embossing tools adapted for receiving coiled tape supplies which are not contained within magazines, a relatively inexpensive, easily dismantled or dismembered magazine could find use merely as a vehicle for storing and vending coiled tape supplies prior to insertion of such a supply in a tool and could be economically discarded where such tools are not adapted to receive magazines.

It is therefore an important object of the invention to provide means in an embossing tool for cooperating with corresponding means in a simple magazine supply of a strip of embossable material to locate and secure the magazine supply within the body of the tool and to provide a magazine construction which allows smooth and ready advancement and retraction of the strip.

Another object of the invention is to provide a magazine having means for cooperatively engaging corresponding locating and securing means in the body of the embossing tool when the magazine is in place in the body of the tool and having a construction which allows advancement and retraction of the supply of embossable material therein with ease.

A further object of the invention is to provide a magazine supply of embossable material of the character described wherein the embossable material is in coiled strip form and is readily advanced from or retracted into the supply held within the magazine by virtue of the magazine having rotatable component parts permitting free rotation of the coiled strip.

A still further object of the invention is to provide a magazine supply of the character described above which is simple in construction and is readily dismantled or dismembered for releasing the coiled supply therein in completely coiled form, the magazine being so economical to fabricate as to be practical for use in storing and handling of coiled supplies as well as for dispensing strip material from a coiled supply and readily disposable.

The invention may be described briefly as a combination including a tool for embossing strip material wherein a strip of embossable material is advanced along a fixed path through the body of the tool from a strip supply located in the body toward embossing means in the body and is selectively retracted back into the supply, a magazine containing the supply, the magazine having a spool-like construction including a first unitary member having a radially extending first flange portion and an integral axially extending generally tubular arbor portion for supporting a coil of the strip material, a second unitary member having an axially extending spindle portion retained within the arbor portion such that the arbor portion is rotatable relative to the spindle portion and an integral radially extending second flange portion axially spaced from the first flange portion for retaining the coil upon the first unitary member, the second flange portion including first locating and securing means, the tool having a socket in the body thereof within which socket the magazine is received, second locating and securing means in the body of the tool juxtaposed with the socket and cooperatively engaging the first locating and securing means in the second flange portion to accurately locate and secure the magazine within the socket and preclude rotation of the second unitary member relative to the tool body while permitting rotation of the first unitary member and the coil of strip material thereon during advancement and retraction of the strip material from and to the magazine. The invention further contemplates a magazine as described above and an improved embossing tool for receiving the magazine.

The invention will be more fully understood and further objects and advantages thereof will become apparent in the following detailed description of an embodiment of the invention illustrated in the accompanying drawing, in which:

FIGURE 1 is a general sectional view of an embossing tool constructed in accordance with the invention;

FIGURE 2 is an exploded perspective view of a magazine constructed in accordance with the invention;

FIGURE 3 is a fragmentary sectional view of a portion of the tool of FIGURE 1; and FIGURE 4 is an enlarged cross-sectional view taken along line 4—4 of FIGURE 1.

Referring now to the drawing, and particularly to FIGURE 1, a hand-operated embossing tool is illustrated generally at 10. Tool 10 has a body or housing 12 which has a general configuration adapted to make the tool easily operated while being held in one hand. The tool is designed for embossing selected indicia in an elongated strip of embossable material such as the variety of thermoplastic resins currently available in the form of plastic tapes of various widths. An embossable tape 14 is supplied in the form of a roll or coil 16 which is contained within a spool-like magazine 18 received within a socket 19 in the housing 12 through a door 20 in the housing hinged thereto at 22 and covering the entrance 24 of the socket.

Embossing of the tape 14 is accomplished at an embossing station 26 wherein there is located embossing means shown in the form of an embossing die set 28 actuated by a reciprocating actuating member 30. Die set 28 is one of a series of die sets located in the periphery of selector wheel 32 which is rotatably mounted in housing 12 so that any one of the series of die sets can be located at the embossing station 26 to emboss selective indicia in the tape 14. Selector wheel 32 is made up of upper and lower disks 34 and 36, respectively, one of which carries the die and the other of which carries the punch of each die set. Disks 34 and 36 are interlocked with one another so that both are rotated together upon rotation of selector wheel 32.

Tape 14 is fed along a fixed path from supply coil 16 through a duct 42 toward the embossing station 26 by feed means 44 which comprises a feed roll 46 which frictionally grips the tape where a pressure roll 48 presses the tape against the surface of the feed roll and advances the tape in prescribed increments by being rotated in a counterclockwise direction along with shaft 50 upon which feed roll 46 is mounted, shaft 50 being journaled in the housing, all as will be explained hereinafter.

Embossing of tape 14 is accomplished by displacing actuating means illustrated in the form of lever 52, which is pivotally mounted to housing 12 at 54, in an upward direction to depress lever 52 and bring actuating member 30 vertically upwardly into contact with a portion of lower disk 36 and continuing such displacement until member 30 actuates the die set 28 positioned at the embossing station 26 and an embossment is established in the tape. At the same time, a pawl 56 is moved vertically upwardly to engage the next successive tooth of a ratchet wheel 58 which is operatively interengaged with feed roll 46 such that rotation of the ratchet wheel will rotate the feed roll. Rotation of ratchet wheel 58 is precluded during the upward movement of pawl 56 by detent 60 which resiliently engages further teeth of the ratchet wheel by virtue of the resilient bias of detent spring 61. During the depression of actuating lever 52, helical spring 62 is compressed so that upon completion of the embossing operation and release of actuating lever 52, the lever 52 is urged back to its starting or rest position by spring 62 with a force sufficient to assure that pawl 56 will rotate ratchet wheel 58 in a counterclockwise direction against the deterrent of the detent 60 to rotate feed roll 46 and advance tape 14 through the increment necessary to index the tape for a subsequent embossing operation. Detent 60 further serves to accurately define the desired increment of rotation so that the tape is automatically indexed through a length sufficient to accurately locate each successive embossment on the tape. A window 64 is provided in order to enable the embossed indicia to be viewed immediately after the completion of the embossing operation and the advancement of the tape.

Upon completion of the particular embossed article, the article may be severed from the tape by actuating a tape cut-off mechanism through the displacement, or depression, of a second actuating lever or bar 66, which is also mounted in the housing for pivotal movement at 54. Upward displacement of bar 66 will move an anvil member 67 upwardly to bring tape 14 into contact with cutting blades 68 and 70 fixed in the housing. Anvil member 67 is pivotally mounted in bar 66 so that upon such upward movement, the anvil member will press tape 14 against blades 68 and 70. Blade 70 will then sever the tape while blade 68 will establish a tab at the severed end of the completed embossed article for facilitating the subsequent removal of a backing strip which is generally presented as a part of the embossed strip material. A leaf spring 72 will return actuating bar 66 and anvil member 67 back to their normal starting position upon release of bar 66. A knob (not shown) is operatively connected to shaft 50 for manually rotating feed roll 46 whenever it is desired to advance or retract tape 14 without actuating lever 52 as will be explained hereinafter.

The embossing means provided at embossing station 26 in the form of selectable die sets in selector wheel 32 are interchangeable by virtue of selector wheel 32 being removable and being capable of replacement by a like selector wheel having die sets for establishing embossments of a different style or type in tape 14. Housing 12 is provided with a slot 80 which communicates with embossing station 26 and with the exterior of housing 12 and is complementary to selector wheel 32 for receiving the selector wheel within the housing. Thus, slot 80 extends along a length from a forward end 82 to a rearward end 84 corresponding to a chord of the selector wheel 32 and has a fixed width between upper and lower opposite sides 86 and 88, respectively, corresponding to the thickness of the selector wheel. A plate-like member 90 of flexible material is fixed at the upper side of slot 80 and extends laterally to establish a cantilever structure in the nature of a leaf spring. A portion of the leaf spring structure is depressed to provide a first detent means in the form of a downwardly extending projection 94 which is located a distance from embossing station 26 equal to the radial distance between the center of selector wheel 32 and the die sets adjacent the periphery thereof. A second detent means is provided in the form of a socket 100 established at the center of the selector wheel by means of a central aperture in the wheel which has a diameter corresponding to the diameter of projection 94 and receives the projection therein. Thus, selector wheel 32 is retained within slot 80 in a housing 12 of the tool by the cooperation of projection 94 and socket 100. Bearing surfaces are provided in selector wheel 32 at boss 101 and an opposite boss 102 which cooperate with the housing structure and the member 90, respectively, to allow rotation of selector wheel 32 while the wheel is accurately maintained in place in the tool.

Selector wheel 32 is readily removed from the tool by merely pulling the wheel out of the slot 80 in a direction perpendicular to the plane of the paper. The flexibility of the material of member 90 coupled with the tapered or frustoconical configuration of the projection 94 will permit ready resilient upward bending of the cantilever structure of member 90 to release the projection from socket 100 and enable the selector wheel to be removed without the necessity for dismantling any component parts of the tool. The cooperating detent means provided by the projection 94 and socket 100 also allow easy insertion of a selector wheel into the slot and positive accurate location and retention thereof within the slot with a minimum of effort and complexity.

The construction and operation of tool 10 requires that tape 14 pass between upper and lower disks 34 and 36 of selector wheel 32 or the path to the embossing station 26. Since the tape cut-off mechanism described above lies forward of the embossing station, a length of tape will always lie between the disks of the selector wheel upon completion of an embossed article. It will be apparent that the existence of a length of tape between the disks of a selector wheel which is to be removed may cause a problem during the removal of the wheel in that the tape may be snagged by one or more of the die sets at the periphery of the wheel and may be pulled laterally causing damage to the tape as well as difficulty in the removal of the wheel. Likewise, the presence of a length of tape in slot 80 during the placement of a selector wheel into the slot could impede the insertion of a wheel into the slot as well as cause damage to the tape should the tape not be aligned so as to slip between the disks during such insertion.

In order to alleviate such difficulties, tool 10 is provided with means for permitting selectable retraction of a tape from the embossing station 26 and from between the disks 34 and 36 so that the slot 80 will be cleared of any length of tape 14 during removal or insertion of selector wheel 32. Thus, housing 12 is shown having a cam member 110 adjacent a ratchet wheel 58. Pawl 56 is provided with a follower 114 thereon which cooperatively engages the surface of cam member 110 to move the pawl in a manner which will now be described.

As set forth above, pawl 56 is mounted to lever 52 for movement therewith during actuation of the lever 52. Pawl 56 is pivotally mounted upon lever 52 at 116 and is normally urged toward engagement with ratchet wheel 58 by resilient means shown in the form of a helical spring 118. However, when lever 52 is at its starting or rest position, the pawl is precluded from engagement with the ratchet wheel by virtue of the contact between the surface of cam member 110 and follower 114. Upon depression of lever 52 to an actuated or depressed position, the cam surface no longer precludes the engagement of the pawl with the ratchet wheel and helical spring 118 urges the pawl into engagement with the ratchet wheel. Upon the return movement of the lever 52 toward the rest position by helical spring 62, the pawl will rotate the ratchet wheel and the feed roll 46 so as to advance tape 14 through the desired increment.

Upon completion of the increment of rotation of the ratchet wheel and feed roll, further travel of the lever 52 back to the rest position will engage follower 114 with cam member 110 and the pawl will be drawn away from the ratchet wheel to disengage the pawl from the teeth of the ratchet wheel. Since the pawl is disengaged from the ratchet wheel when the lever arrives at the rest position, shaft 50 can be manually rotated by the knob fixed thereto to rotate the feed roll in a reverse direction without interference from the pawl and ratchet wheel mechanisms to retract the tape from between the disks of the selector wheel. It is noted that detent 60 is provided with a spherical end surface and detent spring 61 is resilient enough to allow forward or reverse rotation of feed roll 46 by manual rotation of shaft 50 to either advance or retract tape 14 with ease. Such advancement and retraction of the tape is helpful not only in providing for ease in interchanging selector wheels but is also helpful in providing for interchanging tapes where it is desired to change from a tape of one color to a tape of another color.

As described above, magazine 18 is received within a socket 19 adjacent the rear end of the housing 12. Magazine 18 has a spool-like construction which allows the tape 14 to be advanced therefrom and retracted back into the magazine with a minimum of resistance to the movement of the tape. The construction of magazine 18 is best illustrated in FIGURE 2 wherein the magazine is seen to have a first member 120 and a second member 122, each of which members is preferably molded of a synthetic resin in a unitary structure. The first member 120 has a generally radially extending flange 124 from which projects an axially extending arbor portion 126 which is generally tubular. The second member 122 has an axially extending portion shown in the form of a spindle 128 which is also generally tubular, and a radially extending flange portion 130 which is divided into two segments 132 and 134, respectively, by a slot 136 which extends in a direction perpendicular to the axial extent of the spindle and is located along a diameter of flange portion 130 and extends across the spindle such that each segment is integral with the spindle along only limited portions 140 and 142 of the periphery of the spindle for purposes which will be described hereinafter. An annular lip 144 projects radially inwardly from the end 146 of the arbor and corresponding shoulders 148 project radially outwardly from portions of the outer surface of the spindle, both the lip 144 and the shoulders 148 being tapered along corresponding surfaces 150 and 152, respectively, to permit the spindle to be brought into telescopic engagement with the arbor and to allow the shoulders 148 to be passed beyond the lip 144 (see FIGURE 4) to secure the first and second members together with the first member being rotatable with respect to the second member. Thus, in assembling the first and second members to form a fully loaded magazine, a coil 16 of tape is merely placed over the arbor portion 126 of the first member and the spindle 128 is inserted into the arbor portion to contain the coil between the flange 124 and flange portion 130. A pair of relatively short projections 154 extend outwardly from the flange portion 130, one projection being integral with each segment 132 and 134 and each projection being located adjacent the upper end 156 of the slot 136. The slot flares outwardly adjacent the lower end 158 thereof for purposes which will now be explained.

Turning to FIGURE 3, the housing 12 is provided with a key 160 which projects into the socket 19 and extends in a direction generally perpendicular to the direction of the fixed path along which the tape 14 is advanced or retracted in the tool. The key 160 has a length which extends essentially from the entrance 24 at the top of the socket to the bottom of the socket. A pair of grooves 162 extend parallel with the key 160 in the housing and are juxtaposed with each side of the key 160 adjacent the top end 164 thereof. The grooves 162 each have an opening 166 at the top of the socket and terminate in a seat 168.

In placing the magazine 18 within the socket 19 of the tool 10, the door 20 is opened and the slot 136 in the second flange portion 130 is aligned with the key 160 in the socket, the flared end 158 of the slot 160 facilitating such alignment and insertion of the key into the slot. The magazine is then moved downwardly so that the key engages the slot along the length thereof and the projections 154 enter the grooves 162 and are supported by the seats 168 in the manner illustrated in FIGURE 4. Thus, when the magazine is completely installed within the socket of the tool, the cooperation of the key with the slot will accurately locate the magazine within the socket and will anchor the second member 122 against rotation relative to the body of the tool as well as secure the entire magazine against movement during advancement or retraction of the tape from or to the coil 16. The cooperation of the projections 154 with the grooves 162 will suspend the magazine within the socket so that the first member 120 is free to rotate by virtue of the arbor portion 126 being rotatably mounted upon the now fixed spindle 128. Thus, the coil 16, which is mounted upon the arbor portion 126 becomes freely rotatable with respect to the second member 122 by virtue of the rotational relationship between the first member 120 and the second member 122 and the first member 120 serves primarily as a reel for freely dispensing or collecting the tape during advancement or retraction thereof without frictional engagement of the tape with the magazine or the socket. In order to contain the tape within the coil 16 in the magazine, guide tabs 170 are provided and are spaced along the periphery of the flange portion 130 (also see FIGURE 2). The guide tabs 170 project axially inwardly from flange portion 130 to keep the tape from uncoiling while the tape is stored in the magazine.

Magazine 18 thus provides an inexpensive storage and handling device as well as providing specific means for cooperating with corresponding means in the tool to aid in dispensing the tape from the coil 16. Where it is desired to employ the coil 16 alone in those tools which are designed to accept tape in coil form and not in magazines, magazine 18 may be dismantled or dismembered readily by tearing each segment 132 and 134 from the spindle along the relatively short portions 140 and 142 where the segments are attached to the spindle. While these short portions 140 and 142 are sufficient to retain the segments integral with the spindle they are short enough to allow the segments, which are relatively thin, to be torn from the spindle with ease. In addition, by choosing a material which is relatively stiff and frangible, the segments may be broken away even more easily. Once the segments are torn from the spindle, the coil may be released intact from between the flange portions and rendered free for use outside the magazine.

Thus it will be seen that magazine 18 may serve a dual function since it operates effectively as a magazine for dispensing as well as accepting retracted tape with ease and is economical enough in construction and fabrication to serve as a storage and handling device which can be economically broken away from the supply stored therein and discarded where a magazine is not appropriate in the use of the coiled supply.

It is to be understood that the above detailed description of an embodiment of the invention is provided by way of example only and is not intended to restrict the invention. Various details in design and construction may be modified without departing from the true spirit and scope of the invention as set forth in the appended claims.

What is claimed is:

1. In combination,
   a tool for embossing strip material wherein a strip of embossable material is advanced along a fixed path through the body of the tool from a strip supply located in the body toward embossing means in the body and is selectively retracted back into the supply;
   a magazine containing said supply, said magazine having a spool-like construction including
   a first unitary member having a radially extending first flange portion and an integral axially extending generally tubular arbor portion for supporting a coil of said strip material;
   a second unitary member having an axially extending spindle portion retained within said arbor portion such that the arbor portion is rotatable relative to the spindle portion and an integral radially extending second flange portion axially spaced from said first flange portion for retaining the coil upon the first unitary member, said second flange portion including first locating and securing means;
   the tool having a socket in the body thereof within which socket the magazine is received;
   second locating and securing means in the body of the tool juxtaposed with said socket and cooperatively engaging said first locating and securing means in the second flange portion to accurately locate and secure the magazine within the socket and preclude rotation of the second unitary member relative to the tool body while permitting rotation of the first unitary member and the coil of strip material thereon during advancement and retraction of the strip material from and to the magazine.

2. The combination of claim 1 wherein:
   said first locating and securing means includes a slot in the second flange portion extending in a direction generally perpendicular to the spindle portion; and
   said second locating and securing means includes a key projecting into the socket and extending in a direction transverse to the direction of said fixed path, said key being in cooperative engagement with said slot.

3. The combination of claim 2 wherein:
   said first locating and securing means includes at least one projection integral with the second flange portion and extending in an axial direction outwardly from the second flange portion; and
   said second locating and securing means includes at least one groove in the body of the tool juxtaposed with the socket and extending from an open end to a seat;
   said projection lying within said groove and against said seat such that the magazine is supported within the socket with the first unitary member free to rotate relative to the second unitary member during said advancement and retraction of the strip material.

4. A magazine for containing a strip supply of embossable material in a coil in a combination including a tool for embossing strip material in which tool a strip of embossable material is advanced along a fixed path through the body of the tool from a strip supply located in the body toward embossing means in the body and is selectively retracted back into the supply, the magazine being capable of reception within a socket in the body, the combination further including locating and securing means in the body of the tool juxtaposed with the socket, the magazine having a spool-like construction comprising:
   a first unitary member having a radially extending first flange portion and an integral axially extending generally tubular arbor portion for supporting the coil of strip material;
   a second unitary member having an axially extending spindle portion retained within said arbor portion such that the arbor portion is rotatable relative to the spindle portion and an integral radially extending second flange portion axially spaced from said first flange portion for retaining said coil upon the first member, said second flange portion including locating and securing means complementary to the locating and securing means in the body of the tool such that when the magazine is received within the socket the locating and securing means of the second flange portion will cooperatively engage the locating and securing means in the body of the tool to accurately locate and secure the magazine within the socket and preclude rotation of the second unitary member relative to the tool body while permitting rotation of the first unitary member and the coil of strip material thereon in response to advancement and retraction of the strip material.

5. The magazine of claim 4 wherein the locating and securing means in the body of the tool includes a key extending in a direction transverse to the direction of said fixed path and the locating and securing means of the second flange portion includes a slot therein extending in a direction generally perpendicular to the spindle portion.

6. The magazine of claim 5 wherein the locating and securing means in the body of the tool includes at least one groove having an opening and a seat therein and the locating and securing means of the second flange includes at least one projection integral therewith and extending in an axial direction outwardly from the second flange portion for being received within said groove with the projection lying against said seat to support and secure the magazine within the socket while maintaining the first unitary member free to rotate relative to the second unitary member during advancement and retraction of the strip material.

7. A spool-like magazine for storing a coil of strip material therein and selectively dispensing said strip therefrom, said magazine comprising:
- a first unitary member having a radially extending first flange portion and an integral axially extending generally tubular arbor portion for supporting said coil of strip material;
- a second unitary member having an axially extending spindle portion received within said arbor portion and retained therein such that the arbor portion is rotatable relative to the spindle portion and an integral radially extending second flange portion axially spaced from said first flange portion for retaining said coil upon the first member;
- a slot extending through at least a portion of said second flange portion and across at least a portion of said spindle portion, said slot dividing the second flange portion into segments each fixed to only a portion of the perimeter of the spindle portion such that the segments may be torn readily from the spindle portion to allow said coil to be removed intact from said magazine; and
- locating and securing means in said second flange portion for locating and securing the magazine within an embossing tool.

8. The magazine of claim 7 wherein the second flange portion is divided into two segments by said slot, the slot extending continuously diametrically through said second flange portion and across said spindle portion.

9. The magazine of claim 8 wherein the arbor portion is provided with a radially inwardly projecting lip and the spindle portion is provided with radially outwardly extending shoulders cooperating with said lip to retain the spindle portion within the arbor portion.

10. In a tool of the class wherein a strip of embossable material is advanced along a fixed path through the body of the tool from a coil of strip material in a magazine located in a socket in the body toward embossing means in the body and is selectively retracted back into the coil along the path, the magazine including first and second unitary members assembled for rotation relative to one another, each unitary member having a radially extending flange portion such that the magazine is provided with first and second axially spaced, radially extending first and second flange portions rotatable relative to one another in response to rotation of said coil of strip material, the coil of strip material being retained on said first unitary member, and said second flange portion having first locating and securing means including a slot extending in a direction generally perpendicular to the axis of rotation of said second flange portion, the improvement comprising:
- second locating and securing means in the body of the tool juxtaposed with the socket and complementary to said first locating and securing means so as to engage said first locating and securing means when the magazine is received within the socket to locate and secure the magazine therein, said second locating and securing means including a key projecting into the socket and extending in a direction transverse to the direction of said fixed path for cooperatively engaging said slot in the second flange portion and precluding rotation of the second unitary member relative to the body of the tool while permitting rotation of the first unitary member and the coil of strip material thereon during advancement and retraction of the strip material.

11. The improvement of claim 10 wherein the first locating and securing means includes at least one projection integral with the second flange portion and extending in an axial direction outwardly from the second flange portion and the second locating and securing means includes at least one groove in the body of the tool juxtaposed with the socket and having an opening at one end thereof and a seat therein for receiving the projection against the seat to support and secure the magazine within the socket while maintaining the first unitary member free to rotate relative to the second unitary member during advancement and retraction of the strip material.

References Cited
UNITED STATES PATENTS

| | | | |
|---|---|---|---|
| 11,097 | 7/1890 | Ray | 197—175 |
| 2,667,257 | 1/1954 | Hurtado | 197—175 |
| 2,930,465 | 3/1960 | Lotsch | 197—6.7 |
| 3,127,989 | 4/1964 | Travaglio | 198—6.7 X |
| 3,129,813 | 4/1964 | Norvelle | 197—6.7 X |
| 3,155,215 | 11/1964 | Avery | 197—6.7 |
| 3,272,304 | 9/1966 | Morelli | 197—175 X |

ROBERT E. PULFREY, *Primary Examiner.*

E. S. BURR, *Assistant Examiner.*